Figure 1:
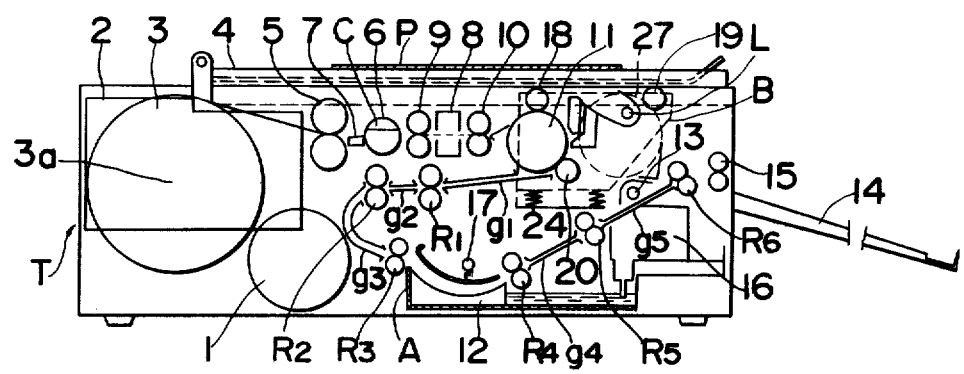

United States Patent
Kakiuchi et al.

[11] 3,955,888
[45] May 11, 1976

[54] ELECTROPHOTOGRAPHIC COPYING APPARATUS

[75] Inventors: Tokuzi Kakiuchi, Osaka; Atsuyuki Tanaka, Sakae, both of Japan

[73] Assignee: Minolta Camera Kabushiki Kaisha, Azuchi, Japan

[22] Filed: July 22, 1974

[21] Appl. No.: 490,709

[30] Foreign Application Priority Data
Aug. 6, 1973   Japan................................ 48-92566

[52] U.S. Cl............................................. 355/1; 355/8; 355/11; 355/49
[51] Int. Cl.²........................................ G03G 15/22
[58] Field of Search............ 355/1, 8, 11, 16, 47–51, 355/66, 55, 60; 350/96 B

[56] References Cited
UNITED STATES PATENTS

| | | | |
|---|---|---|---|
| 2,959,095 | 11/1960 | Magnusson | 355/49 |
| 3,398,669 | 8/1968 | Hicks | 355/1 |
| 3,560,084 | 2/1971 | Limberger | 355/50 X |
| 3,637,303 | 1/1972 | Komori et al. | 355/8 |
| 3,658,407 | 4/1972 | Kitano et al. | 355/1 X |
| 3,677,633 | 7/1972 | Huber | 355/8 X |
| 3,697,409 | 10/1972 | Weigl | 355/8 X |

*Primary Examiner*—L. T. Hix
*Assistant Examiner*—Kenneth C. Hutchison
*Attorney, Agent, or Firm*—Wenderoth, Lind & Ponack

[57] ABSTRACT

A slit exposure scanning type electrophotographic copying apparatus has an optical system enclosed in an optical frame within which a light source for illumination, an image transmitter formed by a bundle of optical fibers of graded refractive index, and other associated elements are secured in predetermined relative positions with the optical frame urged to engage a movable or stationary transparent platform for placing an original to be copied for easy focusing and positioning adjustments in assembling the copying apparatus. The concept of the optical frame is applicable both to a copying apparatus with a moving platform and a stationary optical system, and one with a stationary platform and a moving optical system irrespective of whether it is a wet-copying process type or dry-copying process type.

10 Claims, 4 Drawing Figures

ELECTROPHOTOGRAPHIC COPYING APPARATUS

The present invention relates to a copying apparatus and, more particularly to a copying apparatus of the slit exposure scanning type employing an optical system enclosed in an optical frame within which a light source for illumination, an image transmitter formed by a bundle of optical fibers of graded refractive index and associated elements are secured at predetermined relative positions.

Conventionally, since various elements such as a plurality of mirrors and lens groups are employed for an optical system in the copying apparatus of the above described type, it is necessary to effect accurate positioning of relative positions between such elements with delicate focusing adjustments of the image to be formed in assembling and manufacturing of such an apparatus, which fact inevitably reduces working efficiency to a large extent.

Furthermore, such a complicated optical system unavoidably results in a large size of the copying apparatus itself against the recent trend in the industry to relatively small-sized copying apparatuses.

In order to cope with such disadvantages, one of the copying machines that has been developed so far employs for its optical system an image transmitter composed of a plurality of "SELFOC" (a trade mark registered in Japan and owned by Nippon Sheet Glass Co., Ltd.) lenses in a bundled configuration.

The SELFOC lens is to an image transmitting optical fiber having a refractive index distribution in a cross section thereof that varies consecutively and parabolically outwards from a center portion, said refractive index distribution satisfying the following equation: $n = N(1-ar^2)$, wherein N is a refractive index at the center, $n$ is a refractive index at a distance $r$ from the center and $a$ is a positive constant. The SELFOC lens and the image transmitter formed by a bundle of SELFOC lenses are described in the U.S. Pat. No. 3,658,407, patented on Apr. 25, 1972, and therefore reference may be made thereto for the details thereof, the term "bundle of optical fibers" as used herein meaning a bundle of such fibers as disclosed in said patent.

However, even in a copying apparatus equipped with such SELFOC lenses, accurate adjustments of the optical system for perfect focusing of the images are still required in positioning the SELFOC lens in relation to the platform for the original or to other elements in the optical system especially in a type of copying apparatus in which the optical system is adapted to reciprocate relative to a stationary platform.

Accordingly, an essential object of the present invention is to provide a copying apparatus having an optical system of simple construction with extremely easy positioning and focusing adjustments and resultant high working efficiency in assembling and manufacturing.

Another important object of the present invention is to provide a copying apparatus of the above described type which is accurate in functioning and easy to maintain and still can be manufactured at a comparatively low cost.

A still further object of the present invention is to provide a copying apparatus of the above described type which is compact in size and light in weight.

According to a preferred embodiment of the present invention, the copying apparatus is equipped with an optical frame in which an optical system comprising an image transmitter with associated light source and mirrors is fixedly enclosed at predetermined positions, and which is provided with a pair of intermediate rollers and another pair of supporting rollers, each pair of rollers being rotatably mounted with a fixed interval therebetween, at the upper portion of the optical frame, on the opposite side walls of said frame, and an exposure roller rotatably supported, below the intermediate rollers, by said side walls and suitably urged toward the intermediate rollers for engagement and synchronous rotation therewith, with the optical frame biased toward the under surface of the transparent platform, at the intermediate rollers and supporting rollers, by spring means provided between the bottom of the optical frame and the frame of the copying apparatus, so that upon movement of the platform in the scanning direction, the exposure roller rotates to transport the photosensitive copy paper sheet attracted onto the surface of the former to an exposure position adjacent to the image transmitter.

As is seen from the above description, according to the copying apparatus of the present invention, since the optical system is enclosed in the compact optical frame with optical elements such as the image transmitter, the light source and mirrors fixed in advance at predetermined positions, and with the optical frame itself maintained at an optimum relation to the platform by the urging force of the spring means, no elaborate adjustments of relative positions among optical elements or between the platform and the optical system are required for bringing the image rays into focus in assembling and manufacturing of the apparatus.

Adoption of the compact optical frame together with the SELFOC lens is very advantageous in reducing the size and weight of the copying apparatus.

It is another advantage of the present invention that the concept of the optical frame with the SELFOC lens is applicable both to a copying apparatus with a reciprocating platform and a fixed optical frame, and one with a stationary platform and a reciprocating optical frame by simple alteration of the associated mechanisms.

Figure 2:
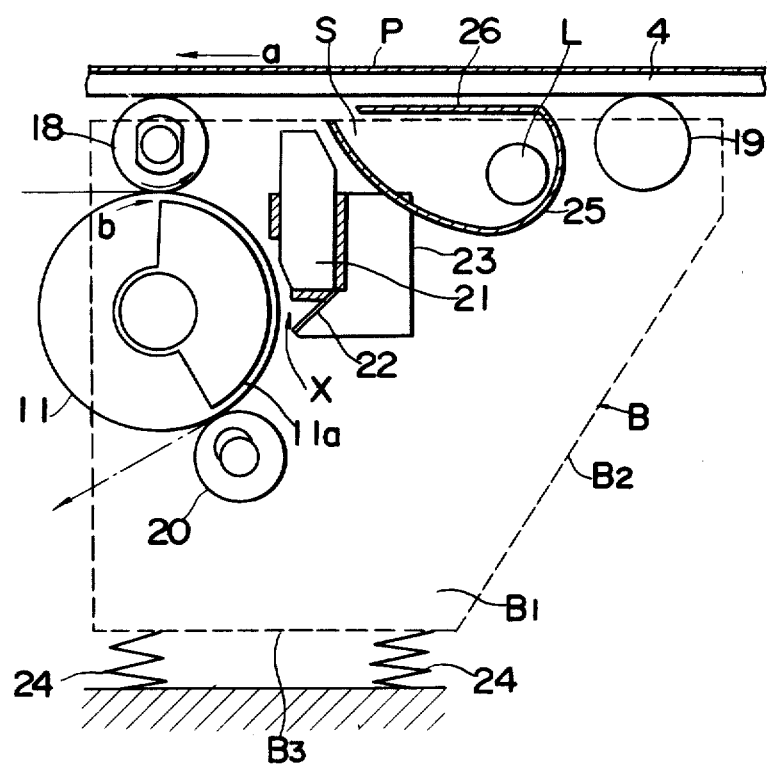
Figure 3:
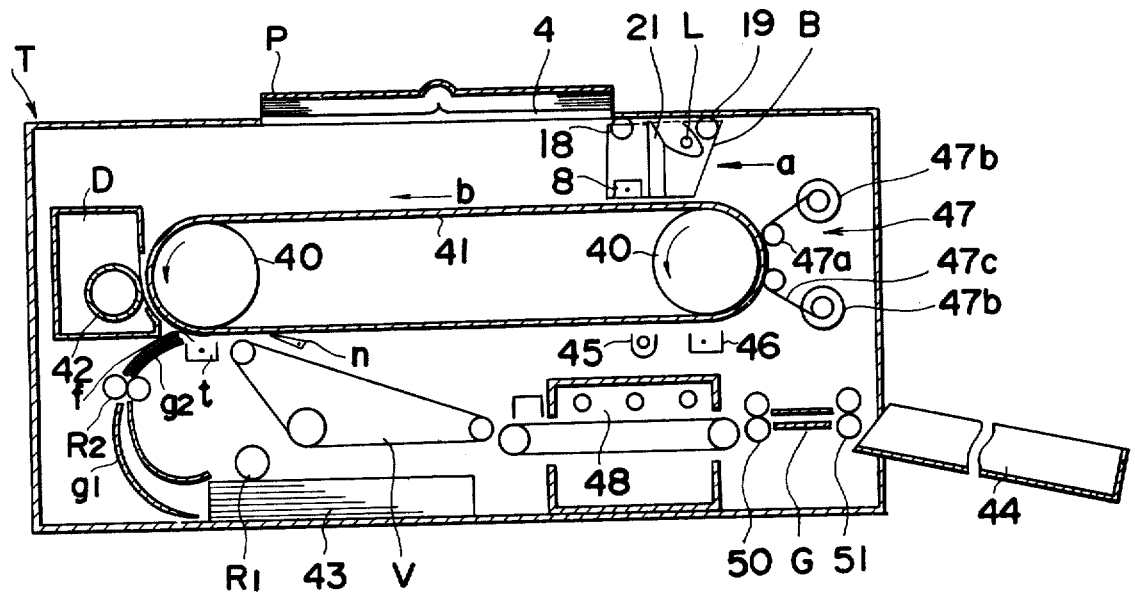
Figure 4:
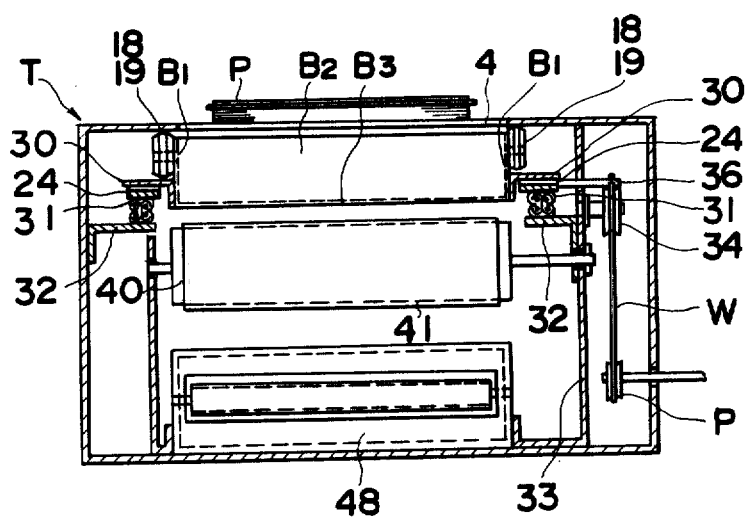

These and other objects and features of the present invention will become apparent from the following description taken in conjunction with the preferred embodiment thereof with reference to the accompanying drawings, in which;

FIG. 1 is a schematic diagram showing a sectional side view of a copying apparatus according to a first embodiment of the present invention, FIG. 2 is a cross sectional view, on an enlarged scale, of an optical frame employed in the apparatus of FIG. 1, FIG. 3 is a schematic diagram showing a sectional side view of a copying apparatus according to a second embodiment of the present invention and, FIG. 4 is a sectional rear view of the apparatus of FIG. 3 with a cleaning device and delivery rollers removed.

Before the description of the present invention proceeds, it is to be noted that like parts are designated by like numerals throughout the several views of the accompanying drawings.

Referring to FIGS. 1 and 2, there is shown a wet-copying process slit exposure type copying apparatus of the Electrofax system which comprises a horizontally movable transparent platform 4 on which is placed an original P to be copied reciprocatingly supported on the upper portion of the apparatus T, an optical frame B fixedly provided below the platform 4 at the upper right portion of the apparatus T in FIG. 1 and including therein an optical system for exposure and an exposure roller 11 rotatably supported in the side walls of the frame B, a roll 3 of photosensitive copy paper rotatably supported by a shaft 3a fixed on a side wall at the upper left portion of the apparatus T, a high voltage transformer 2 and a main motor 1 for driving various parts of the apparatus.

Three pairs of copy paper feeding rollers 5, 9 and 10 are rotatably disposed, at regular intervals, between the paper roll 3 and the exposure roller 11 in the path of the copy paper with a paper cutting device C including a stationary blade 7 and a rotatory blade 6 provided between the rollers 5 and 9 and with a charger 8 disposed between the rollers 9 and 10.

Referring particularly to FIG. 2, the optical frame B comprising the side walls B1, a rear wall B2 and a bottom plate B3 includes a pair of intermediate rollers 18 and another pair of supporting rollers 19 with each pair of rollers rotatably supported, at a fixed location, by the side walls B1 at the upper portion of the frame B, and a pair of compression springs 24 provided between the bottom plate B3 and a frame of the apparatus so as to urge the optical frame B toward the platform 4 with the rollers 18 and 19 contacting platform 4 for fixing the frame B in position. The exposure roller 11 engages, under proper pressure, with the intermediate rollers 18 and another set of intermediate rollers 20 rotatably disposed below the roller 11 by spring means (not shown) provided between the rollers 18 and 11 and also the rollers 11 and 20.

The optical frame B further includes an exposure lamp L for illuminating the original P enclosed in a curved reflecting shade 25 having a slit adjusting plate 26, an image transmitter 21 formed by a bundle of optical fibers of graded refractive index, and a reflecting mirror 22 fixedly provided below the image transmitter 21 at an angle of approximately 45° to the axis of the latter so as to direct the light image from the original P onto the exposure roller 11.

By this arrangement, the web of copy paper from the paper roll 3 fed through the paper feeding rollers 5 which are adapted to rotate in synchronization with the movement of the platform 4 is cut into a required length of copy paper sheet by the cutting device C, and the copy paper sheet is further fed onto the exposure roller 11 through the paper feeding rollers 9 and 10 after being charged by the corona charger 8.

Since the exposure roller 11 engages, under pressure, with the intermediate rollers 18 which are in turn urged against the under surface of the platform 4, the roller 11 rotates in the direction of the arrow $b$ as the platform 4 moves in the direction of the arrow $a$ with the copy paper sheet attracted onto the outer periphery of the exposure roller 11 by the suction force of a suitable suction device 11a enclosed within the roller 11.

Light from the exposure lamp L is projected onto the original P placed on the platform 4 through a slit S formed between the curved reflecting shade 25 and the slit adjusting plate 26, and image rays from the original P are reflected through the image transmitter 21 secured to a support 23 fixed to a frame of the apparatus and then reflected by the mirror 22 onto the photosensitive copy paper sheet carried along the surface of the roller 11 at an exposure position X for sequentially exposing the copy paper sheet.

The copy paper sheet thus exposed to the image rays from the original P is fed to a developing device A having a developing tank 12, passing between the rollers 11 and 20, and through guide plates $g1$, rollers R1, guide plates $g2$, rollers R2, guide plates $g3$ and rollers R3.

A developing solution supply tank 16 is provided at the right lower portion of the apparatus T for continuously replenishing the developing tank 12 with the developing solution, while an opening 17 is formed above the tank 12 for pouring the developing solution pumped up from the tank 12 by a separate suction means (not shown) onto the copy paper sheet.

After completion of the developing, the developed copy paper sheet is fed to a heater 13 provided with a cooling fan 27 thereabove through rollers R4, guide plates $g4$ and rollers R5, and then discharged onto a tray 14 through guide plates $g5$, rollers R6, and rollers 15.

It should be noted here that, although the above description refers to a copying apparatus with a movable platform and a fixed optical system, the present invention is applicable, by a simple alteration in the associated mechanism, to a copying apparatus with a movable optical system and a stationary platform, and that the invention can also be applied to a dry-copying process copying apparatus as well as a wet-copying process copying apparatus.

Referring now to FIGS. 3 and 4 showing a second embodiment of the invention. In this embodiment, there is shown a dry-copying process toner powder image transfer type copying apparatus of xerographic system type which comprises a stationary transparent platform 4 on which is placed an original P to be copied fixedly supported on the upper portion of the apparatus T, a horizontally movable optical frame B which is reciprocatingly supported below the platform 4 by a pair of guide rails 31 mounted, at opposite sides of the frame B, on supports 32 fixed to the frames 33 of the apparatus T, and which includes therein an optical system for exposure such as an exposure lamp L enclosed in a curved reflector 25, an image transmitter 21 formed by a bundle of optical fibers of graded refractive index and a corona charger 8, and a photoreceptor 41 in the configuration of an endless belt rotatably supported, below the platform 4, on a pair of rollers 40, and various processing devices such as a developing device D, with a developing roller 42 a transfer corona charger $t$, an erasing discharger 46 and a cleaning device 47 disposed along the path of the photoreceptor surface 41.

A single sheet of copy paper is adapted to be separated from the top of the stack 43 of copy paper sheet by a roller R1 and fed to a transfer position $f$ between the photoreceptor surface 41 and the transfer corona charger $t$ through guide plates $g1$, rollers R2 and guide plates $g2$.

Referring particularly to FIG. 4, the optical frame B composed of side walls B1, a rear wall B2 and a bottom plate B3 has two pairs of rollers, rollers 18 and supporting rollers 19, each pair of which are rotatably supported, at a fixed distance from each other, by the side walls B1 at the upper portion of the frame B.

A pair of support plates 30 are fixedly mounted on opposite side walls B1, extending outwardly at right angles to the surfaces of the side walls B1, each of which support plates 30 is urged upward by an indulating plate spring 24 secured to a guide rail 31 slidably mounted on a support plate 32 fixed to a frame 33 of the apparaus T, thus the optical frame B being adapted to reciprocate while being urged toward the platform 4.

In order to drive the optical frame B in the scanning or returning direction, a wire W is passed around a pulley P secured to a shaft of a driving motor (not shown) and a plurality of pulleys 34 are rotatably mounted on the frame of the apparatus T with ends of the wire W fixed to a pin 36 extending outwardly from the spring plate 24, so that upon rotation of the motor (not shown), the wire moves the pin 36 and consequently the optical frame B in the desired directions along the guide rails 31.

By this arrangement, as the optical frame is driven in the scanning direction shown by the arrow $a$ in FIG. 3, an electrical charge is uniformly imparted by the corona charger 8 to the photoreceptor surface 41 which remains stationary during the scanning.

Immediately following the charging by the corona charger 8, the image rays from the original P on the stationary platform 4 illuminated by the lamp L are directed onto the charged photoreceptor surface 41 through the image transmitter 21 for the formationn of the electrostatic latent image on the photoreceptor surface 41.

After the formation of the latent image on the photoreceptor surface 41, the photoreceptor 41 is adapted to rotate by a suitable conventional means in the direction of the arrow $b$ with the latent image developed by the brush bristle developing roller 42 of the developing device D, and the developed toner powder image on the photoreceptor 41 is then transferred onto the copy paper sheet fed from the stack 43 at the transfer position $f$ between the surface 41 and the transfer charger $t$. The copied paper sheet is then separated from the surface 41 by a known separating piece $n$ pivotally mounted on the frame of the apparatus and fed into the fixing device 48 through a conveyor belt $v$ rotatably supported on three rollers, after which fixing the copy paper sheet is discharged onto a tray 44 through rollers 50, guide plates G and rollers 51.

In the mean time, the charge remaining on the photoreceptor surface 41 is erased by an erasing lamp 45 and an erasing charger 46 and the toner powder remaining on the surface 41 is wiped off by a paper web cleaner 47 comprising a paper web 47c supported, in contact with the surface 41, on a pair of rotatable rollers 47a and reels of paper web 47b driven by conventional means, whereby the photoreceptor 41 is ready for the subsequent copying.

The optical frame B is adapted to return to the original starting position after completion of the scanning.

As is clear from the above description, since the optical frame of the invention is easily kept in position by two pairs of rollers urged against the under surface of the platform by suitable spring means while having a single and light weight optical element such as the image transmitter instead of conventional optical systems comprising a plurality of lens groups and mirrors, the optical system is correctly maintained at a fixed distance from the platform if the image transmitter etc. is accurately secured in the frame B in advance, thus making it possible to effect correct image focusing without necessitating complicated adjustments as required in the prior art.

Furthermore, it is another advantage of the present invention that, since the optical system is of compact size, the copying apparatus can be made much smaller in size and lighter in weight than conventional copying apparatus.

Although the present invention has been fully described by way of example with reference to the attached drawings, it is to be noted that various changes and modifications are apparent to those skilled in the art. Therefore, unless otherwise such changes and modifications depart from the scope of the present invention, they should be construed as included therein.

What is claimed is:

1. In a slit exposure type electrophotographic copying apparatus which comprises a horizontally, reciprocatingly movable transparent platform on which can be placed an original to be copied, a stationary optical system provided below said platform, said optical system including a light source for illuminating said original and means for directing image rays from said original to an exposure position thereof, an exposure roller rotatably provided adjacent to said image ray directing means adjacent said exposure position, means for charging and feeding a photosensitive copy paper sheet to said exposure roller, means for developing said copy paper sheet after exposure, and means for discharging said copy paper sheet from said apparatus after drying, the improvement comprising an optical frame within which said light source and said image ray directing means are secured in predetermined relative positions, a first pair of rollers and a further pair of rollers spaced from said first pair, each of said pairs of rollers being rotatably mounted at an upper portion of said optical frame, said exposure roller being rotatably mounted below said first rollers, and a third pair of rollers for transportation of said copy paper sheet rotatably mounted below said exposure roller, means urging said first rollers and said third rollers into contact with said exposure roller for synchronous rotation therewith, and spring means between the bottom of said optical frame and said copying apparatus and biasing said optical frame against the under surface of said platform with said first and second rollers, contacting said under surface so that said exposure roller rotates in association with movement of said platform.

2. A slit exposure type electrophotographic copying apparatus as claimed in claim 1, wherein said image ray directing means enclosed in said optical frame comprises an image transmitter formed by a bundle of optical fibers of graded refractive index and extending from adjacent said transparent platform to said exposure position.

3. A slit exposure type electophotographic copying apparatus as claimed in claim 1, wherein said charging means for said photosensitive copy paper sheet is disposed in the path of said copy paper sheet between said paper feeding means and said exposure roller.

4. In a slit exposure type electrophotographic copying apparatus which comprises a stationary transparent platform on which can be placed an original to be copied, a horizontally reciprocatingly movable optical system provided below said platform, said optical system including a light source for illuminating said original and means for directing image rays from said original to a point at the bottom of said optical system, a photosensitive endless belt the outwardly facing surface of which is a photoreceptor surface and which endless belt is suspended by a plurality of rollers for intermittent rotation in timed relation with movement of said optical system, said photosensitive endless belt provided below said point of said optical system and being movable along a path relative to a plurality of processing stations, disposed along said path, one station being a charging station having a corona charger for uniformly charging said endless belt, a second station being a slit exposure station, a third station being a developing station, a fourth station being a transferring station, a fifth station being a cleaning station and a substation being a discharging station, each of said stations being actuatable in timed relation to the rotation of said endless belt, and movement of said optical frame, means for feeding copy paper sheets, means for fixing toner powder images on said copy paper sheets and means for carrying said fixed copy paper sheets out of said copying apparatus, the improvement comprising an optical frame within which said light source, said image ray directing means and said corona charger are secured in predetermined relative positions, a first pair of rollers and a second pair of rollers spaced from said first pair rollers, each pair of said rollers being rotatably mounted at an upper portion of said optical frame, and spring means for urging said optical frame toward the under surface of said platform with said rollers against said under surface, means coupled to said frame for supporting and slidably moving said optical frame reciprocatingly in a direction parallel to said platform and a forward run of said endless belt, and driving means coupled to said endless belt for holding said belt stationary during the movement of said optical frame in a scanning direction for formation of an electrostatic latent image on said endless belt, and rotating said belt after said latent image has been formed on said endless belt.

5. A slit exposure type electrophotographic copying apparatus as claimed in claim 4, wherein said image ray directing means enclosed in said optical frame comprises an image transmitter formed by a bundle of optical fibers of graded refractive index and extending from adjacent said transparent platform to said point.

6. A slit exposure type electrophotographic copying apparatus as claimed in claim 4, wherein said spring means for urging said optical frame toward said platform comprises a pair of undulating plate springs, first support plates being secured to opposite sides of said optical frame and second support plates being secured to said copying apparatus, in positions opposed to the respective first support plates, said plate springs being between the respective opposed pairs of support plates.

7. A slit exposure type electrophotographic copying apparatus as claimed in claim 6 wherein said means for supporting and slidably moving said optical frame reciprocatingly comprises a pair of guide rails secured to the under sides of said plate springs and slidable on said second support plates and a wire having both ends thereof connected to said optical frame, a driving motor and a plurality of pulleys over which said wire runs between said optical frame and said motor.

8. A slit exposure type electrophotographic copying apparatus comprising a transparent platform on which can be placed an original to be copied, an optical frame disposed below said transparent platform and having a bundle of optical fibers of graded refractive index extending through said frame as an image transmitting means, at least two pairs of rollers on said optical frame in contact with the under surface of said transparent platform, spring means provided between said optical frame and the remainder of said copying apparatus for biasing said frame toward said transparent surface, said spring means and said at least two pairs of rollers determining the setting position of said optical frame for keeping the focus between said original and said bundle of optical fibers constant.

9. A slit exposure type electrophotographic copying apparatus as claimed in claim 8 wherein said transparent platform is reciprocatingly movable with respect to said optical frame.

10. A slit exposure type electrophotographic copying apparatus comprising a transparent platform on which can be placed an original to be copied, an optical frame disposed below said transparent platform and having a bundle of optical fibers of graded refractive index extending through said frame as an image transmitting means, at least two pairs of rollers on said optical frame in contact with the under surface of said transparent platform, spring means provided between said optical frame and the remainder of said copying apparatus for biasing said frame toward said transparent surface, said spring means and said at least two pairs of rollers determining the setting position of said optical frame for keeping the focus between said original and said bundle of optical fibers constant, one of said optical frame and said transparent platform being movable relative to the other, and reciprocating means coupled to the movable one of said optical frame and said transparent platform for reciprocatingly moving it relative to the other.

* * * * *